US012597029B2

(12) United States Patent
Kaja et al.

(10) Patent No.: US 12,597,029 B2
(45) Date of Patent: *Apr. 7, 2026

(54) SYSTEM, METHOD, AND COMPUTER PROGRAM PRODUCT FOR AUTHENTICATING A TRANSACTION

(71) Applicant: Visa International Service Association, San Francisco, CA (US)

(72) Inventors: Venkata Naga Pradeep Kumar Kaja, Foster City, CA (US); Vijayaraju Konkathi, Union City, CA (US)

(73) Assignee: Visa International Service Association, San Francisco, CA (US)

( * ) Notice: Subject to any disclaimer, the term of this patent is extended or adjusted under 35 U.S.C. 154(b) by 610 days.

This patent is subject to a terminal disclaimer.

(21) Appl. No.: 17/949,352

(22) Filed: Sep. 21, 2022

(65) Prior Publication Data

US 2023/0020600 A1     Jan. 19, 2023

Related U.S. Application Data

(63) Continuation of application No. 16/633,865, filed as application No. PCT/US2017/043461 on Jul. 24, 2017, now Pat. No. 11,494,771.

(51) Int. Cl.
*G06Q 20/40* (2012.01)
*G06F 21/32* (2013.01)
*G06Q 20/20* (2012.01)

(52) U.S. Cl.
CPC ....... *G06Q 20/40145* (2013.01); *G06F 21/32* (2013.01); *G06Q 20/206* (2013.01)

(58) Field of Classification Search
USPC ........................................................ 705/44
See application file for complete search history.

(56) References Cited

U.S. PATENT DOCUMENTS 6,853,716 B1 * 2/2005 Shaffer ................... H04M 3/56
                                                379/202.01
6,978,238 B2 * 12/2005 Wohlsen ................. G10L 17/24
                                                704/E17.016

(Continued)

FOREIGN PATENT DOCUMENTS

WO      2019116052 A1      6/2019

OTHER PUBLICATIONS

S. J. Vaughan-Nichols, "Voice authentication speaks to the marketplace," in Computer, vol. 37, No. 3, pp. 13-15, Mar. 2004 (Voice) (Year: 2004).*

(Continued)

*Primary Examiner* — Chikaodinaka Ojiaku
(74) *Attorney, Agent, or Firm* — The Webb Law Firm

(57) ABSTRACT

Provided is a computer-implemented method for authenticating a transaction. The method includes associating, in at least one database, a plurality of voice identifiers with a plurality of users, each voice identifier of the plurality of voice identifiers corresponding to a user having at least one account identifier, receiving audio data comprising a spoken voice identifier, determining a detected voice identifier from the plurality of voice identifiers in the at least one database, the detected voice identifier matching the spoken voice identifier, determining a user from the plurality of users based at least partially on the detected voice identifier, in response to determining the user of the plurality of users, communicating a notification to a device associated with the user, the notification comprising transaction data associated with the transaction, and in response to receiving an authentication signal from the device associated with the user, conducting the transaction.

18 Claims, 4 Drawing Sheets

(56) References Cited

U.S. PATENT DOCUMENTS

| | | | |
|---|---|---|---|
| 7,487,090 B2* | 2/2009 | Creamer | G10L 17/26 |
| | | | 379/88.02 |
| 8,079,079 B2* | 12/2011 | Zhang | H04L 63/08 |
| | | | 726/19 |
| 8,751,801 B2 | 6/2014 | Harris et al. | |
| 9,092,781 B2* | 7/2015 | Schultz | G06Q 20/40145 |
| 9,130,929 B2 | 9/2015 | Dorfman et al. | |
| 9,703,942 B2 | 7/2017 | Cockcroft | |
| 9,721,282 B2* | 8/2017 | Hitchcock | H04W 4/021 |
| 9,754,258 B2* | 9/2017 | Sheets | G06F 21/32 |
| 9,773,278 B2 | 9/2017 | Imrey et al. | |
| 9,883,387 B2 | 1/2018 | Wilson et al. | |
| 9,898,723 B2* | 2/2018 | Rutherford | G06Q 20/20 |
| 10,032,036 B2 | 7/2018 | Khan et al. | |
| 10,134,039 B2 | 11/2018 | Sheets et al. | |
| 10,147,091 B2 | 12/2018 | Gardiner et al. | |
| 10,257,185 B2 | 4/2019 | Wong et al. | |
| 10,270,748 B2 | 4/2019 | Briceno et al. | |
| 10,402,827 B2 | 9/2019 | Sheets et al. | |
| 10,432,617 B2 | 10/2019 | Gerber et al. | |
| 10,453,050 B1* | 10/2019 | Arumugam | G06Q 20/4014 |
| 10,521,566 B2 | 12/2019 | Choi et al. | |
| 10,535,060 B2 | 1/2020 | Caglayan et al. | |
| 10,552,822 B2 | 2/2020 | Caglayan et al. | |
| 10,810,574 B1 | 10/2020 | Wilson et al. | |
| 10,891,610 B2 | 1/2021 | Powell et al. | |
| 11,556,359 B2* | 1/2023 | Hart | G06F 3/0482 |
| 11,610,228 B2* | 3/2023 | Cohn | H04W 4/21 |
| 11,663,659 B2* | 5/2023 | Saste | G06F 17/18 |
| | | | 705/38 |
| 11,720,900 B1* | 8/2023 | Rangan | G06F 3/0481 |
| | | | 705/4 |
| 11,810,021 B2* | 11/2023 | Campbell | G06F 16/29 |
| 11,915,329 B2* | 2/2024 | Perry | G08G 1/096805 |
| 12,033,222 B1* | 7/2024 | Sivaraman | G06Q 50/01 |
| 12,056,762 B2* | 8/2024 | Hart | G06F 16/23 |
| 12,204,572 B2* | 1/2025 | Arora | G06F 16/334 |
| 12,462,240 B2* | 11/2025 | Ballout | G06Q 20/381 |
| 12,468,820 B2* | 11/2025 | Rapowitz | G06F 21/602 |
| 12,469,095 B1* | 11/2025 | Shipman, Jr. | G06Q 10/1091 |
| 2004/0225499 A1* | 11/2004 | Wang | G10L 15/26 |
| | | | 704/E15.044 |
| 2005/0129189 A1* | 6/2005 | Creamer | G10L 17/26 |
| | | | 379/88.02 |
| 2007/0005988 A1* | 1/2007 | Zhang | H04L 63/08 |
| | | | 726/17 |
| 2007/0055517 A1* | 3/2007 | Spector | G07C 9/37 |
| | | | 704/E17.016 |
| 2009/0055322 A1 | 2/2009 | Bykov et al. | |
| 2009/0073116 A1 | 3/2009 | Horiuchi et al. | |
| 2009/0204530 A1 | 8/2009 | Hanson | |
| 2009/0292649 A1* | 11/2009 | Somech | G06Q 40/02 |
| | | | 705/36 R |
| 2010/0235285 A1 | 9/2010 | Hoffberg | |
| 2011/0093389 A1* | 4/2011 | Singhal | G06Q 20/12 |
| | | | 705/43 |
| 2011/0238510 A1* | 9/2011 | Rowen | G06V 40/382 |
| | | | 705/16 |
| 2011/0302083 A1 | 12/2011 | Bhinder | |
| 2012/0132706 A1* | 5/2012 | McKenzie | H04L 9/3234 |
| | | | 235/380 |
| 2013/0151419 A1 | 6/2013 | Hitchcock et al. | |
| 2013/0290136 A1* | 10/2013 | Sheets | G06Q 20/4016 |
| | | | 705/26.35 |
| 2014/0090039 A1 | 3/2014 | Bhow | |
| 2014/0162598 A1 | 6/2014 | Villa-Real | |
| 2014/0172430 A1* | 6/2014 | Rutherford | G06F 3/167 |
| | | | 704/273 |
| 2014/0222678 A1 | 8/2014 | Sheets et al. | |
| 2014/0279472 A1 | 9/2014 | Caglayan et al. | |
| 2014/0316984 A1* | 10/2014 | Schwartz | G06Q 20/322 |
| | | | 705/44 |
| 2014/0365354 A1* | 12/2014 | Shvarts | G06Q 40/02 |
| | | | 705/38 |
| 2014/0372128 A1* | 12/2014 | Sheets | G06Q 20/20 |
| | | | 704/273 |
| 2014/0379582 A1 | 12/2014 | Caglayan et al. | |
| 2015/0046257 A1 | 2/2015 | Tabor et al. | |
| 2015/0206139 A1* | 7/2015 | Lea | G06Q 20/382 |
| | | | 705/44 |
| 2015/0317627 A1* | 11/2015 | Howe | G06Q 20/20 |
| | | | 705/67 |
| 2015/0332273 A1 | 11/2015 | Bruno | |
| 2016/0034891 A1 | 2/2016 | Carpenter et al. | |
| 2016/0034892 A1 | 2/2016 | Carpenter et al. | |
| 2016/0036800 A1 | 2/2016 | Carpenter et al. | |
| 2016/0093138 A1 | 3/2016 | Munakata et al. | |
| 2016/0260078 A1 | 9/2016 | Phillips et al. | |
| 2016/0306974 A1 | 10/2016 | Turgeman et al. | |
| 2017/0004482 A1 | 1/2017 | Mancini | |
| 2017/0063932 A1 | 3/2017 | Hubbard et al. | |
| 2017/0171195 A1 | 6/2017 | Chang et al. | |
| 2017/0193491 A1 | 7/2017 | Phipps | |
| 2017/0195356 A1 | 7/2017 | Turgeman et al. | |
| 2017/0243225 A1 | 8/2017 | Kohli | |
| 2017/0270530 A1* | 9/2017 | Sheets | G10L 17/22 |
| 2017/0293989 A1 | 10/2017 | Hodge | |
| 2017/0330215 A1 | 11/2017 | Bruno et al. | |
| 2017/0337366 A1 | 11/2017 | Lu et al. | |
| 2017/0344997 A1* | 11/2017 | Pattanayak | G06Q 20/409 |
| 2018/0005321 A1* | 1/2018 | Lee | G06Q 40/02 |
| 2018/0039990 A1 | 2/2018 | Lindemann | |
| 2018/0113675 A1* | 4/2018 | Rutherford | G06F 21/32 |
| 2018/0240110 A1 | 8/2018 | Smets et al. | |
| 2018/0253718 A1 | 9/2018 | Khan et al. | |
| 2018/0293579 A1 | 10/2018 | Tetali et al. | |
| 2018/0336543 A1 | 11/2018 | van Os et al. | |
| 2018/0336551 A1 | 11/2018 | Mouftah et al. | |
| 2018/0349909 A1* | 12/2018 | Allen | G06Q 20/40145 |
| 2019/0050864 A1 | 2/2019 | Sheets et al. | |
| 2019/0050865 A1 | 2/2019 | Sheets et al. | |
| 2019/0164156 A1 | 5/2019 | Lindemann | |
| 2019/0340620 A1 | 11/2019 | Sheets et al. | |
| 2020/0058032 A1* | 2/2020 | Lad | G06V 40/1365 |
| 2020/0153821 A1 | 5/2020 | Cao et al. | |
| 2021/0081923 A1 | 3/2021 | Rafferty et al. | |
| 2022/0036356 A1* | 2/2022 | Praszczalek | G06F 21/45 |
| 2023/0020600 A1* | 1/2023 | Kaja | G06Q 20/206 |
| 2025/0104075 A1* | 3/2025 | Zhang | G06Q 30/0613 |
| 2025/0342520 A1* | 11/2025 | Lee | G06F 3/011 |

OTHER PUBLICATIONS

Laird, "Taking a Hard-Line Approach to Encryption" Computer, Mar. 2007, pp. 13-15, vol. 37, No. 03.

Srinivasan et al., "Is Speech Recognition Becoming Mainstream?", Computer, 2002, pp. 38-41, vol. 35, No. 4.

Vaughan-Nichols, "Voice Authentication Speaks to the Marketplace", Computer, Mar. 2004, pp. 13-15, vol. 37, No. 3.

* cited by examiner

SYSTEM, METHOD, AND COMPUTER PROGRAM PRODUCT FOR AUTHENTICATING A TRANSACTION

CROSS REFERENCE TO RELATED APPLICATIONS

This application is a continuation application of U.S. patent application Ser. No. 16/633,865, which has a filing date of Jul. 24, 2017, which is the United States national phase of International Application No. PCT/US2017/043461 filed on Jul. 24, 2017, the disclosures of which are hereby incorporated by reference in their entirety.

BACKGROUND

1. Technical Field

This disclosure relates generally to authenticating a transaction and, in some non-limiting embodiments or aspects, to a system, method, and computer program product for authenticating a transaction using a voice identifier and/or other biometric inputs.

2. Technical Considerations

To conduct a transaction, such as a payment with a merchant or a withdrawal from an automated teller machine (ATM), account holders must use a physical payment card or an electronic payment method based on near-field communication (NFC). These methods require physical contact with a payment card or mobile device with a terminal and, in some examples, require PIN codes to be entered. Each of these existing methods potentially exposes the user's account identifier and/or PIN. For example, when swiping a physical payment card, a skimmer device may be used to steal sensitive account information. Further, entering a PIN visually exposes this secret to others that may be watching from a distance.

Existing contactless payment methods require complicated and expensive sensors which must be possessed by each account holder. These methods require adoption of specialized hardware by all users and merchants that wish to conduct contactless payments.

Accordingly, there is a need for a technically improved system and method for authenticating a transaction.

SUMMARY

Accordingly, provided are improved systems, methods, and apparatus for authenticating a transaction.

According to some non-limiting embodiments or aspects, provided is a computer-implemented method for authenticating a transaction, comprising: associating, in at least one database, a plurality of voice identifiers with a plurality of users, each voice identifier of the plurality of voice identifiers corresponding to a user having at least one account identifier; receiving, with at least one processor, audio data comprising a spoken voice identifier; determining, with at least one processor, a detected voice identifier from the plurality of voice identifiers in the at least one database, the detected voice identifier matching the spoken voice identifier; determining, with at least one processor, a user from the plurality of users based at least partially on the detected voice identifier; in response to determining the user of the plurality of users, communicating, with at least one processor, a notification to a device associated with the user, the notification comprising transaction data associated with the transaction; and in response to receiving an authentication signal from the device associated with the user, conducting a transaction using an account identifier associated with the user.

In some non-limiting embodiments or aspects of the method, the audio data further comprises a spoken account identifier, the detected voice identifier is associated with a plurality of account identifiers for the user, and the method further includes: determining, with at least one processor, the account identifier used to conduct the transaction from the plurality of account identifiers for the user based at least partially on the spoken account identifier. In some non-limiting embodiments or aspects, the detected voice identifier is associated with a plurality of account identifiers for the user, and the method further includes: determining, with at least one processor, the account identifier used to conduct the transaction from the plurality of account identifiers based on user input received from the device associated with the user.

In some non-limiting embodiments or aspects, determining the detected voice identifier comprises comparing at least a portion of the audio data to the plurality of voice identifiers or data derived from the plurality of voice identifiers. In some non-limiting embodiments or aspects, the notification prompts the user, through the device, to provide a biometric input. In some non-limiting embodiments or aspects, the authentication signal is generated by the device associated with the user in response to authenticating the biometric input. In some non-limiting embodiments or aspects, the audio data is received by a merchant point-of-sale system comprising a microphone, and wherein the detected voice identifier is determined by a server remote from the merchant point-of-sale system. In some non-limiting embodiments or aspects, the audio data is received by the device associated with the user, the device comprising a microphone. In some non-limiting embodiments or aspects, the same processor is used to determine the detected voice identifier, determine the user from the plurality of users, and communicate the notification.

According to some non-limiting embodiments or aspects, provided is a computer program product for authenticating a transaction using a plurality of voice identifiers associated with a plurality of users, each voice identifier of the plurality of voice identifiers corresponding to a user having at least one account identifier, comprising at least one non-transitory computer readable medium including program instructions that, when executed by at least one processor of at least one computer, cause the at least one computer to: (a) receive audio data comprising a spoken voice identifier; (b) determine a detected voice identifier from the plurality of voice identifiers in the at least one database, the detected voice identifier matching the spoken voice identifier; (c) determine a user from the plurality of users based at least partially on the detected voice identifier; (d) in response to determining the user of the plurality of users, communicate a notification to a device associated with the user, the notification comprising transaction data associated with the transaction; and (e) in response to receiving an authentication signal from the device associated with the user, conduct a transaction using an account identifier associated with the user.

In some non-limiting embodiments or aspects of the computer program product, the audio data further comprises a spoken account identifier, the detected voice identifier is associated with a plurality of account identifiers for the user, and the program instructions, when executed by the at least one processor, further cause the at least one computer to:

determine the account identifier used to conduct the transaction from the plurality of account identifiers for the user based at least partially on the spoken account identifier. In some non-limiting embodiments or aspects, the detected voice identifier is associated with a plurality of account identifiers for the user, and the program instructions, when executed by the at least one processor, further cause the at least one computer to: determine the account identifier used to conduct the transaction from the plurality of account identifiers based on user input received from the device associated with the user.

In some non-limiting embodiments or aspects of the computer program product, determining the detected voice identifier comprises comparing at least a portion of the audio data to the plurality of voice identifiers or data derived from the plurality of voice identifiers. In some non-limiting embodiments or aspects, the notification prompts the user, through the device, to provide a biometric input. In some non-limiting embodiments or aspects, the authentication signal is generated by the device associated with the user in response to authenticating the biometric input. In some non-limiting embodiments or aspects, the audio data is received by a merchant point-of-sale system comprising a microphone, and wherein the detected voice identifier is determined by a server remote from the merchant point-of-sale system. In some non-limiting embodiments or aspects, the audio data is received by the device associated with the user, the device comprising a microphone.

In some non-limiting embodiments or aspects of the computer program product, the at least one non-transitory computer readable medium comprises a first medium and a second medium, wherein the first medium includes program instructions which, when executed by at least one processor of a merchant system, cause the merchant system to perform at least step (a), and wherein the second medium includes program instructions which, when executed by at least one processor of at least one remote server, cause the at least one remote server to perform at least steps (b)-(e).

According to some non-limiting embodiments or aspects, provided is a system for authenticating a transaction comprising: at least one data storage device comprising at least one database, the at least one database comprising a plurality of voice identifiers associated with a plurality of users, each voice identifier of the plurality of voice identifiers corresponding to a user having at least one account identifier; and at least one server computer comprising at least one processor programmed or configured to: receive audio data comprising a spoken voice identifier; determine a detected voice identifier from the plurality of voice identifiers in the at least one database, the detected voice identifier matching the spoken voice identifier; determine a user from the plurality of users based at least partially on the detected voice identifier; in response to determining the user of the plurality of users, communicate a notification to a device associated with the user, the notification comprising transaction data associated with the transaction; and in response to receiving an authentication signal from the device associated with the user, conduct a transaction using an account identifier associated with the user.

In some non-limiting embodiments or aspects of the system, the audio data further comprises a spoken account identifier, wherein the detected voice identifier is associated with a plurality of account identifiers for the user, and wherein the at least one server computer is further programmed or configured to determine the account identifier used to conduct the transaction from the plurality of account identifiers for the user based at least partially on the spoken account identifier.

Further non-limiting embodiments or aspects are set forth in the following numbered clauses.

Clause 1: A computer-implemented method for authenticating a transaction, comprising: associating, in at least one database, a plurality of voice identifiers with a plurality of users, each voice identifier of the plurality of voice identifiers corresponding to a user having at least one account identifier; receiving, with at least one processor, audio data comprising a spoken voice identifier; determining, with at least one processor, a detected voice identifier from the plurality of voice identifiers in the at least one database, the detected voice identifier matching the spoken voice identifier; determining, with at least one processor, a user from the plurality of users based at least partially on the detected voice identifier; in response to determining the user of the plurality of users, communicating, with at least one processor, a notification to a device associated with the user, the notification comprising transaction data associated with the transaction; and in response to receiving an authentication signal from the device associated with the user, conducting a transaction using an account identifier associated with the user.

Clause 2: The computer-implemented method of clause 1, wherein the audio data further comprises a spoken account identifier, and wherein the detected voice identifier is associated with a plurality of account identifiers for the user, the method further comprising: determining, with at least one processor, the account identifier used to conduct the transaction from the plurality of account identifiers for the user based at least partially on the spoken account identifier.

Clause 3: The computer-implemented method of any of clauses 1-2, wherein the detected voice identifier is associated with a plurality of account identifiers for the user, the method further comprising: determining, with at least one processor, the account identifier used to conduct the transaction from the plurality of account identifiers based on user input received from the device associated with the user.

Clause 4: The computer-implemented method of any of clauses 1-3, wherein determining the detected voice identifier comprises comparing at least a portion of the audio data to the plurality of voice identifiers or data derived from the plurality of voice identifiers.

Clause 5: The computer-implemented method of any of clauses 1-4, wherein the notification prompts the user, through the device, to provide a biometric input.

Clause 6: The computer-implemented method of any of clauses 1-5, wherein the authentication signal is generated by the device associated with the user in response to authenticating the biometric input.

Clause 7: The computer-implemented method of any of clauses 1-6, wherein the audio data is received by a merchant point-of-sale system comprising a microphone, and wherein the detected voice identifier is determined by a server remote from the merchant point-of-sale system.

Clause 8: The computer-implemented method of any of clauses 1-7, wherein the audio data is received by the device associated with the user, the device comprising a microphone.

Clause 9: The computer-implemented method of any of clauses 1-8, wherein the same processor is used to determine the detected voice identifier, determine the user from the plurality of users, and communicate the notification.

Clause 10: A computer program product for authenticating a transaction using a plurality of voice identifiers associated with a plurality of users, each voice identifier of the plurality of voice identifiers corresponding to a user having at least one account identifier, comprising at least one non-transitory computer readable medium including program instructions that, when executed by at least one processor of at least one computer, cause the at least one computer to: (a) receive audio data comprising a spoken voice identifier; (b) determine a detected voice identifier from the plurality of voice identifiers in the at least one database, the detected voice identifier matching the spoken voice identifier; (c) determine a user from the plurality of users based at least partially on the detected voice identifier; (d) in response to determining the user of the plurality of users, communicate a notification to a device associated with the user, the notification comprising transaction data associated with the transaction; and (e) in response to receiving an authentication signal from the device associated with the user, conduct a transaction using an account identifier associated with the user.

Clause 11: The computer program product of clause 10, wherein the audio data further comprises a spoken account identifier, wherein the detected voice identifier is associated with a plurality of account identifiers for the user, and wherein the program instructions, when executed by the at least one processor, further cause the at least one computer to determine the account identifier used to conduct the transaction from the plurality of account identifiers for the user based at least partially on the spoken account identifier.

Clause 12: The computer program product of any of clauses 10-11, wherein the detected voice identifier is associated with a plurality of account identifiers for the user, and wherein the program instructions, when executed by the at least one processor, further cause the at least one computer to determine the account identifier used to conduct the transaction from the plurality of account identifiers based on user input received from the device associated with the user.

Clause 13: The computer program product of any of clauses 10-12, wherein determining the detected voice identifier comprises comparing at least a portion of the audio data to the plurality of voice identifiers or data derived from the plurality of voice identifiers.

Clause 14: The computer program product of any of clauses 10-13, wherein the notification prompts the user, through the device, to provide a biometric input.

Clause 15: The computer program product of any of clauses 10-14, wherein the authentication signal is generated by the device associated with the user in response to authenticating the biometric input.

Clause 16: The computer program product of any of clauses 10-15, wherein the audio data is received by a merchant point-of-sale system comprising a microphone, and wherein the detected voice identifier is determined by a server remote from the merchant point-of-sale system.

Clause 17: The computer program product of any of clauses 10-16, wherein the audio data is received by the device associated with the user, the device comprising a microphone.

Clause 18: The computer program product of any of clauses 10-17, wherein the at least one non-transitory computer readable medium comprises a first medium and a second medium, wherein the first medium includes program instructions which, when executed by at least one processor of a merchant system, cause the merchant system to perform at least step (a), and wherein the second medium includes program instructions which, when executed by at least one processor of at least one remote server, cause the at least one remote server to perform at least steps (b)-(e).

Clause 19: A system for authenticating a transaction comprising: at least one data storage device comprising at least one database, the at least one database comprising a plurality of voice identifiers associated with a plurality of users, each voice identifier of the plurality of voice identifiers corresponding to a user having at least one account identifier; and at least one server computer comprising at least one processor programmed or configured to: receive audio data comprising a spoken voice identifier; determine a detected voice identifier from the plurality of voice identifiers in the at least one database, the detected voice identifier matching the spoken voice identifier; determine a user from the plurality of users based at least partially on the detected voice identifier; in response to determining the user of the plurality of users, communicate a notification to a device associated with the user, the notification comprising transaction data associated with the transaction; and in response to receiving an authentication signal from the device associated with the user, conduct a transaction using an account identifier associated with the user.

Clause 20: The system of clause 19, wherein the audio data further comprises a spoken account identifier, wherein the detected voice identifier is associated with a plurality of account identifiers for the user, and wherein the at least one server computer is further programmed or configured to determine the account identifier used to conduct the transaction from the plurality of account identifiers for the user based at least partially on the spoken account identifier.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figures, in which.

DETAILED DESCRIPTION

Figure 1:
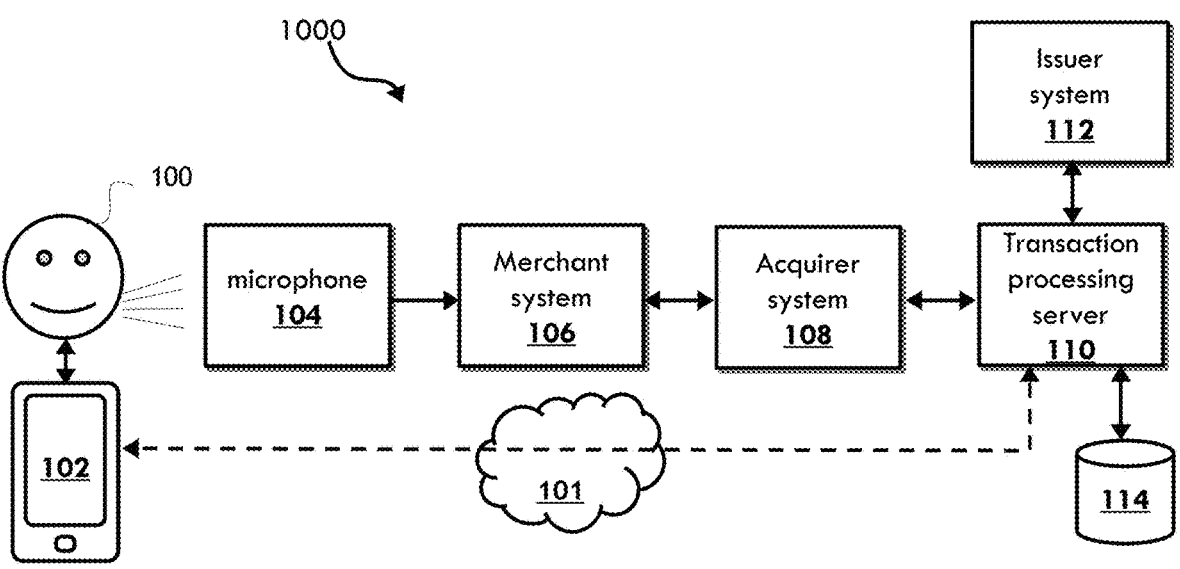
FIG. 1 is a schematic diagram of a system for authenticating a transaction using a voice identifier according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

Non-limiting embodiments of the present disclosure are directed to a system, method, and apparatus for authenticating a transaction that allows for improved security and convenience. In some non-limiting embodiments or aspects, users may conduct transactions with a merchant without using a physical payment card or other portable financial device by using a spoken voice identifier that corresponds to that user. The user may be associated with one or more accounts, and a spoken account identifier may be used to identify a particular account of a plurality of accounts for that user. Upon identifying the user and/or an account identifier corresponding to the user, the system prompts the user for verification before completing the transaction. The user may be prompted for verification through a separate communication channel, such as through a mobile device associated with the user. Non-limiting embodiments or aspects include an enhanced merchant point of sale (POS) system that allows for receipt of a spoken voice identifier by inclusion of a microphone. Further, non-limiting embodiments or aspects provide a technologically improved architecture by safeguarding account information and other sensitive data.

As used herein, the term "transaction service provider" may refer to an entity that receives transaction authorization requests from merchants or other entities and provides guarantees of payment, in some cases through an agreement between the transaction service provider and an issuer institution. The terms "transaction service provider" and "transaction service provider system" may also refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "issuer institution" may refer to one or more entities, such as a bank, that provide accounts to customers for conducting payment transactions, such as initiating credit and/or debit payments. For example, an issuer institution may provide an account identifier, such as a primary account number (PAN), to a customer that uniquely identifies one or more accounts associated with that customer. The account identifier may be embodied on a physical financial instrument, such as a payment card, and/or may be electronic and used for electronic payments. The terms "issuer institution," "issuer bank," and "issuer system" may also refer to one or more computer systems operated by or on behalf of an issuer institution, such as a server computer executing one or more software applications. For example, an issuer system may include one or more authorization servers for authorizing a payment transaction.

As used herein, the term "acquirer institution" may refer to an entity licensed by the transaction service provider and approved by the transaction service provider to originate transactions using a portable financial device of the transaction service provider. The transactions may include original credit transactions (OCTs) and account funding transactions (AFTs). The acquirer institution may be authorized by the transaction service provider to originate transactions using a portable financial device of the transaction service provider. The acquirer institution may contract with a payment gateway to enable the facilitators to sponsor merchants. An acquirer institution may be a financial institution, such as a bank. The terms "acquirer institution," "acquirer bank," and "acquirer system" may also refer to one or more computer systems operated by or on behalf of an acquirer institution, such as a server computer executing one or more software applications.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they can be used to conduct a transaction without directly using the original account identifier. In some examples, an original account identifier, such as a PAN, may be associated with a plurality of tokens for different individuals or purposes. An issuer institution may be associated with a bank identification number (BIN) or other unique identifier that uniquely identifies it among other issuer institutions.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, a POS system, and/or any other device or system capable of communicating with a network.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "portable financial device" may refer to a payment device, an electronic payment device, a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a mobile device executing an electronic wallet application, a personal digital assistant (PDA), a security card, an access card, a wireless terminal, and/or a transponder, as examples. The portable financial device may include a volatile or a non-volatile memory to store information, such as an account identifier or a name of the account holder.

As used herein, the term "biometric input" may refer to any type of biometric provided by a user such as, but not limited to, one or more of the following: a fingerprint, a retinal image, an iris image, a facial image, a hand geometry image, a verbal statement or response, a physiologic indicator, a DNA sample, a signature, and/or the like. The term "biometric input device," as used herein, may refer to one or more devices and/or systems for receiving and/or providing a biometric input. As an example, a biometric input device may include one or more of the following: a fingerprint scanner, a retina and/or iris scanner, a camera, a microphone, a sensor, a touchscreen, and/or the like.

As used herein, the term "server" may refer to or include one or more processors or computers, storage devices, or similar computer arrangements that are operated by or facilitate communication and processing for multiple parties in a network environment, such as the internet, although it will be appreciated that communication may be facilitated over one or more public or private network environments and that various other arrangements are possible. Further, multiple computers, e.g., servers, or other computerized devices, e.g., point-of-sale devices, directly or indirectly communicating in the network environment may constitute a "system," such as a merchant's point-of-sale system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Referring now to FIG. 1, a system 1000 for authenticating a transaction based on a voice identifier is shown according to some non-limiting embodiments or aspects. A user 100 possesses a mobile device 102 and seeks to conduct a transaction with a merchant system 106. The merchant system 106 is in communication with a microphone 104 and a transaction processing server 110. In the system 1000 shown in FIG. 1, the merchant system 106 is in communication with the transaction processing server 110 via an acquirer system 108. The transaction processing server 110 is also in communication with an issuer system 112 and an authentication database 114. It will be appreciated that various other arrangements are possible. For example, the merchant system 106 may communicate directly with the transaction processing server 110. As another example, the merchant system 106 may communicate with the transaction processing server 110 via a payment gateway or other system.

With continued reference to FIG. 1, the mobile device 102 is in communication with the transaction processing server 110 via a network environment 101. The mobile device 102 may include one or more software applications such as, for example, an electronic wallet application. The network environment may include, for example, the Internet and/or a private network. Moreover, the merchant system 106, the acquirer system 108, the transaction processing server 110, and/or the issuer system 112 may communicate via the network environment 101 or one or more other networks. In some non-limiting embodiments or aspects, the merchant system 106, acquirer system 108, transaction processing server 110, and issuer system 112 communicate via secure, private networks.

Still referring to FIG. 1, the microphone 104 may be local to the merchant system 106. For example, the microphone may be integrated with and/or connected to the merchant system 106. An improved merchant POS system may include the microphone 104 and one or more software applications for processing input received through the microphone 104. In examples in which the merchant POS system is a mobile POS system, such as one that utilizes a multipurpose mobile device with a card scanner, the microphone 104 may be built into the mobile device. In some non-limiting embodiments or aspects, the microphone 104 may be external to the merchant system 106. For example, the microphone may be integrated with the mobile device 102 or otherwise in communication with the mobile device 102. In such examples, the mobile device 102 may communicate audio data received by the microphone 104 directly with the merchant system 106 or, additionally or alternatively, may communicate the audio data to an electronic wallet system (not shown in FIG. 1), the transaction processing server 110, the issuer system 112, and/or any other system or device.

As used herein, the term "audio data" refers to any digital representation of audio or data that is derived from such digital representation of audio including, for example, waveforms, digital files, hash values, and/or the like. For example, audio data may include raw audio data output by a microphone and/or audio data processed according to one or more algorithms or otherwise derived from raw audio data. Examples of processed audio data include a waveform pattern, plaintext derived with a natural language processing algorithm, a compressed audio file, and/or the like. The term "audio data" may also refer to a spoken voice identifier or spoken account identifier represented by audio data. The terms "spoken voice identifier" and "spoken account identifier," as used herein, refer to one or more words, phrases, numbers, and/or utterances that can be represented with audio data. A "spoken voice identifier" is a word, phrase, number, and/or utterance that uniquely identifiers a user. A "spoken account identifier" is a word, phrase, number, and/or utterance that uniquely identifies an account corresponding to a user.

With continued reference to FIG. 1, the authentication database 114 may include one or more data structures storing authentication data and/or account data for the user 100 and a plurality of other users. The term "authentication data," as used herein, refers to any data that may be used to authenticate a user or device and may include, for example, identifiers that uniquely identify users and/or devices, audio data associated with each user and/or device, user credentials such as passwords, PINs, biometrics, and/or the like. The term "account data," as used herein, refers to any data concerning one or more accounts for one or more users. Account data may include, for example, one or more account identifiers, user identifiers, transaction histories, balances, credit limits, issuer institution identifiers, and/or the like. Account data may be stored in the authentication database 114 and/or in a separate account database. In some non-limiting examples, the authentication database 114 may be a subset of data within a larger account database. Various other arrangements are possible.

Still referring to FIG. 1, a user 100 speaks a spoken voice identifier that is received by the microphone 104 as audio data representing the spoken voice identifier or at least a portion thereof, which communicates the audio data to the merchant system 106. The audio data may then be communicated from the merchant system 106 to the transaction processing server 110, where it is processed and analyzed. It will be appreciated, however, that the audio data may be received and/or analyzed by the mobile device 102, merchant system 106, issuer system 112, or any other computing device. A user 100, in some examples, may also speak a spoken account identifier that is received by the microphone 104 as audio data, and the microphone 104 communicates that audio data to the merchant system 106 or other computing device for analysis. The spoken account identifier may be a portion of the spoken voice identifier, may be a specific spoken voice identifier of a plurality of spoken voice identifiers for the user 100, or may be a separate word, phrase, or number that is separate from the spoken voice identifier. Further, it will be appreciated that the spoken voice identifier may be a spoken account identifier such that the spoken account identifier is used to identify the user 100 by first identifying an account corresponding to the user 100.

The audio data representing the spoken voice identifier may be analyzed in any number of ways to match the spoken voice identifier to a stored voice identifier in the authentication database 114. The stored voice identifier may be a spoken voice identifier that was previously received from the user 100 during a registration process. The stored voice identifier may be represented by any type of audio data such that it can be compared to a received spoken voice identifier, or audio data derived from a received spoken voice identifier, to determine if it matches. As an example, the audio data representing the spoken voice identifier may be analyzed by processing the audio data with a natural language processing algorithm to determine the words and/or syllables being spoken. In such an example, the stored voice identifier may be in the form of one or more words (such as a name) that can be compared to the words and/or syllables determined from the spoken voice identifier. As another example, the audio data representing the spoken voice identifier may be analyzed by processing the audio data to generate a pattern that may be compared to other patterns in the authentication database 114. A pattern may be generated based on the waveforms of the audio data representing the spoken voice identifier, including but not limited to frequencies and/or amplitudes of such waveforms. In other non-limiting examples, at least a portion of the audio data representing the spoken voice identifier may be processed to generate a unique signature. A unique signature may be generated, for example, by processing audio data with a hash algorithm. It will be appreciated that other variations are possible.

In some non-limiting embodiments or aspects, analyzing the audio data representing the spoken voice identifier may include authenticating the user 100 based on one or more speech recognition techniques. For example, one or more patterns or signatures may be generated based on the cadence, tempo, pitch, frequency, amplitude, and/or other properties of the audio data that can be used by one or more speech recognition algorithms to determine if the user 100 is authentic.

In some non-limiting embodiments or aspects in which audio data representing a spoken account identifier is also received by the microphone 104, the audio data may be analyzed in any number of ways to match the spoken account identifier to an account identifier, or data derived from an account identifier, stored in the authentication database 114. The audio data representing the spoken account identifier may be processed in a way similar to the audio data representing the spoken voice identifier described above to match the spoken account identifier to an account identifier, or data derived from the spoken account identifier, stored in the authentication database 114 or a separate account database. In this manner, the transaction processing server 110 or some other computing device may identify the user 100 and a specific account of that user 100 by analyzing the audio data representing the spoken voice identifier and/or spoken account identifier received by the microphone 104. It will be appreciated that a spoken account identifier may also be used to authenticate the user 100 through one or more speech recognition algorithms.

Still referring to FIG. 1, In some non-limiting embodiments or aspects, after the transaction processing server 110 or some other computing device determines the identity of the user 100 and/or the identity of a specific account of the user 100, the transaction processing server 110 may communicate a verification message to the mobile device 102 via the network environment 101. To communicate the verification message, the transaction processing server 110 may query the authentication database 114 or some other database for a network address or other identifier associated with the user 100 to enable delivery of the verification message. In some non-limiting embodiments or aspects, the verification message may cause the mobile device 102 to prompt the user for verification of the transaction. The prompt may be displayed via a push notification, through an electronic wallet application, by text message, by email, by an automated phone call, and/or in any other like manner. The verification message may include transaction data, such as a transaction value, merchant identifier, account identifier to be used in the transaction, and/or the like. The mobile device 102, in response to receiving a verification from the user 100, may transmit a response message to the transaction processing server 110 to complete the transaction. The mobile device 102 and/or transaction processing server 110 may communicate a message to the merchant system 106 to confirm the verification.

In some non-limiting embodiments or aspects, the verification message may cause the mobile device 102 to prompt the user for an additional input, such as a biometric input, to verify the user's 100 identity. For example, the user 100 may be prompted by the mobile device 102 to provide a fingerprint via a fingerprint reader integrated into the mobile device 102. The biometric input may then be used to verify the user's 100 identity before completing the transaction. It will be appreciated that, in addition or alternative to a biometric input, a user 100 may be prompted to input credentials, such as a user name, password, and/or PIN, to verify the transaction. In some non-limiting embodiments or aspects, the user 100 may respond to the verification message through a second mobile device, such as a wearable device. For example, the user 100 may be authenticated based on a biometric input provided to a second mobile device, such as but not limited to smart glasses that perform a retina and/or iris scan, a smart watch that measures a heart rate or other physiologic signals, and/or the like. In such examples, the mobile device 102 may be in communication with the second mobile device such that, after the mobile device 102 receives the verification message, the mobile device 102 causes the second mobile device to prompt the user to provide a biometric input. The mobile device 102 may communicate with the second mobile device via Bluetooth®, as an example. In other examples, the user 100 may provide a biometric input to the second mobile device without being prompted by the second mobile device. In some examples, the second mobile device may receive a verification message directly from the transaction processing server 110 or some other computing device. Moreover, the user 100 may additionally or alternatively be prompted through the merchant system 106 to provide an additional input to the merchant system 106, such as inputting a PIN into a keypad or placing a fingerprint on a fingerprint reader in communication with the merchant system 106. It will be appreciated that various arrangements are possible.

In some non-limiting embodiments or aspects in which a spoken account identifier is not received and the user 100 is associated with a plurality of accounts, the verification message may also prompt the user 100 through the mobile device 102 to select an account from the plurality of accounts for the transaction. As an example, a user 100 may be prompted with a list of payment cards or account identifiers to choose from. The response message communicated from the mobile device 102 to convey the user's 100 verification of the transaction may additionally include an account identifier, such as a token, to identify the account to use.

Figure 2:
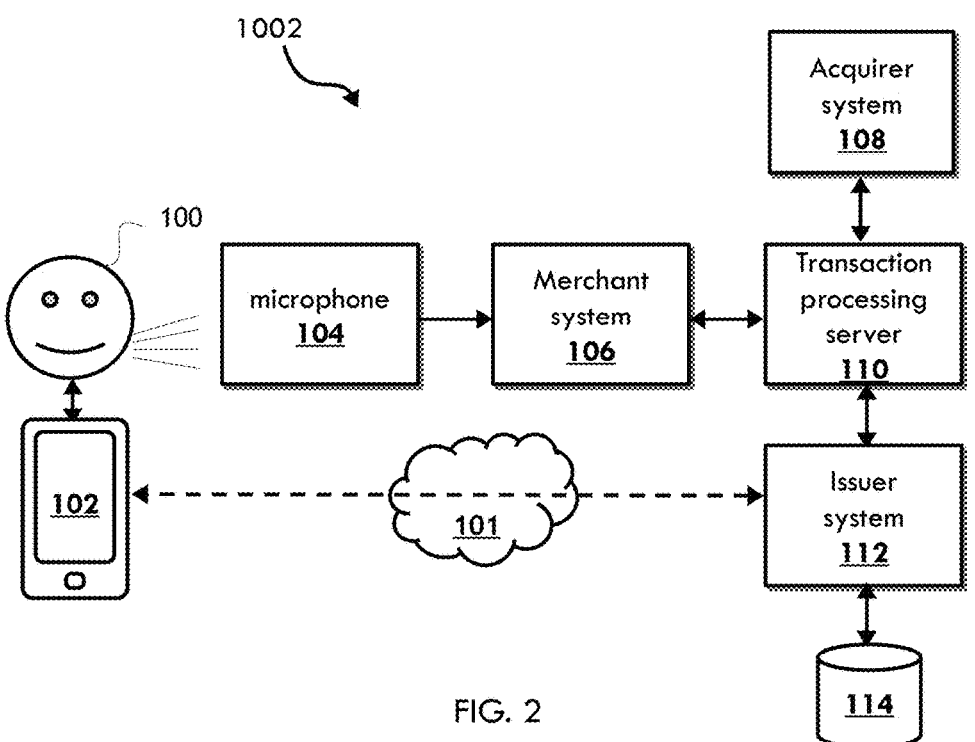
FIG. 2 is a schematic diagram of a system for authenticating a transaction using a voice identifier according to some non-limiting embodiments or aspects.

Referring now to FIG. 2, a system 1002 for authenticating a transaction based on a voice identifier is shown according to some non-limiting embodiments or aspects. In the example shown in FIG. 2, the issuer system 112 hosts the authentication database 114 and is in communication with the mobile device 102. In such an example, the issuer system 112 may analyze the audio data representing the spoken voice identifier and/or spoken account identifier received by the microphone 104. The issuer system 112 may also communicate a verification message to the mobile device 102 as described above. FIG. 2 also shows an arrangement in which the merchant system 106 is in communication with the transaction processing server 110 without passing through the acquirer system 108. As explained above, the merchant system 106 may also be in communication with the transaction processing server 110 via a payment gateway. Various other arrangements are possible.

In some non-limiting embodiments or aspects, and with reference to FIGS. 1 and 2, an electronic wallet server (not shown) may host the authentication database 114, analyze the audio data representing the spoken voice identifier and/or spoken account identifier, and/or communicate a verification message to the mobile device 102 in addition to or instead of the transaction processing server 110 or the issuer system 112. The electronic wallet server may also be, in some non-limiting embodiments or aspects, part of the issuer system 112 and/or the transaction processing server 110. In such examples, the mobile device 102 may include an electronic wallet application that communicates with the electronic wallet server via the network environment 101. The electronic wallet application may also prompt the user 100 for verification through the mobile device 102.

With continued reference to FIGS. 1 and 2, in some non-limiting embodiments or aspects, a user 100 may register one or more spoken voice identifiers and/or spoken account identifiers with the authentication database 114 through a mobile application on the mobile device 102, through a website or application of the transaction processing server 110, issuer system 112, and/or electronic wallet server, at a physical location (e.g., a bank, a kiosk, etc.), over a telephone call (e.g., using an Interactive Voice Response (IVR) system), and/or in any other like manner. The registration process may include a series of prompts for the user 100 to input information, such as typing account information, speaking into a microphone, providing biometric inputs, and/or the like. The registration process may be self-guided or, in other examples, may be directed by an individual at a physical location or over a telephone call or online communication.

In some non-limiting embodiments or aspects, the transaction processing server 110 or another computing device registers one or more voice identifiers and/or account identifiers during tokenization of an account identifier. In such examples, a PAN or other account identifier may be converted to a token for use in electronic payments. The token is stored in an account database (and/or in the authentication database 114) such that it corresponds to a user 100 and a PAN or other account identifier for that user 100. In this manner, the token is mapped to the PAN or other account identifier when conducting a transaction using the token. One or more voice identifiers and/or account identifiers may be associated with and correspond to the token in the database. In examples in which one or more voice identifiers and/or account identifiers are collected during a registration process for an account by an issuer system 112, and where the transaction processing server 110 hosts the authentication database 114, the issuer system 112 may communicate this data to the transaction processing server 110 for storage in an account database and/or the authentication database 114.

In some non-limiting embodiments or aspects, and referring to FIGS. 1 and 2, instead of the user 100 providing a spoken voice identifier to a microphone 104 as part of conducting a transaction, the user 100 may alternatively provide some other biometric input to a biometric input device in communication with the merchant system 106, mobile device 102, and/or transaction processing server 110. For example, a user 100 may approach the merchant system 106, which may be a merchant POS system having a fingerprint reader, to initiate a transaction for goods or services. The user 100 places his or her finger on the fingerprint reader which communicates this biometric input, or data derived from the biometric input, to the merchant system 106 and/or transaction processing server 110. The biometric input, or data derived therefrom, may then be analyzed in any number of ways to match it to an account identifier, or data derived from an account identifier, stored in the authentication database 114. The user may then verify the transaction through the mobile device 102 as described herein. It will be appreciated that other variations are possible.

Figure 3:
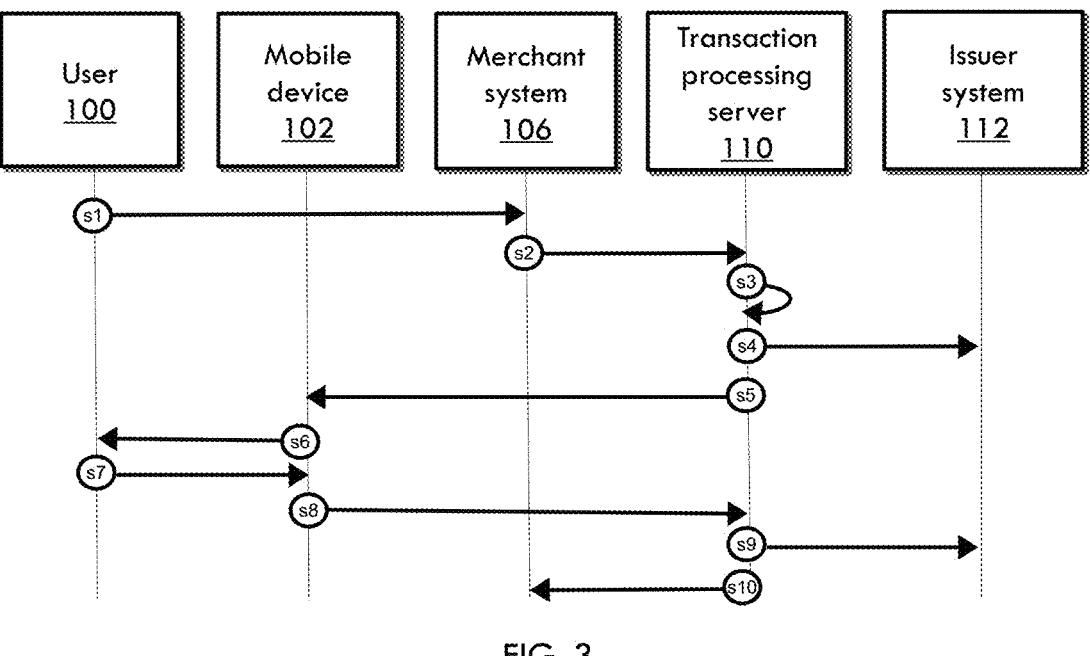
FIG. 3 is a sequence diagram of a method for authenticating a transaction according to some non-limiting embodiments or aspects.

Referring now to FIG. 3, a sequence diagram is shown for a method of authenticating a transaction based on a voice identifier according to some non-limiting embodiments or aspects. It will be appreciated that the sequence and steps shown in FIG. 3 are for example only and that various other sequences and steps may be used. At a first step s1, a user 100 provides audio data to the merchant system 106 via a microphone. The audio data may include a spoken voice identifier and/or a spoken account identifier. As described here, however, it will be appreciated that the audio data may be received by any other computing device. At step s2, the merchant system 106 communicates the audio data, either as received or after being processed, to the transaction processing server 110. This audio data may be packaged with or separate from transaction data associated with an underlying transaction and may be communicated through an acquirer system or payment gateway (not shown in FIG. 3).

With continued reference to FIG. 3, at step s3, the transaction processing server queries a database, such as an authentication database and/or account database, to identify the user 100 and/or a specific account of the user 100 based upon the audio data. As explained herein, the audio data may be processed and analyzed in various ways to match it to the user 100 and/or a specific account. At step s4, the transaction processing server 110 may communicate with the issuer system 112 to obtain any necessary account data for the user 100 and/or to verify the transaction with the issuer system 112. At step s5, the transaction processing server 110 generates and communicates a verification message to the mobile device 102 of the user 100. The verification message may include transaction data and, at step s6, causes the mobile device 102 to prompt the user 100 to verify the transaction. The user 100 may then provide input to verify the transaction at step s7. In some examples, the user 100 may provide one or more biometric inputs for authentication. At step s8, in response to receiving verification from the user 100, the mobile device 102 communicates a response message received from the user 100 to the transaction processing server 110. At step s9, the transaction processing server 110 settles the transaction between the issuer system 112 and an acquirer system 108. At step s10, the transaction processing server 110 communicates a transaction confirmation message to the merchant system 106 so that the transaction can be finalized by the merchant.

Figure 4:
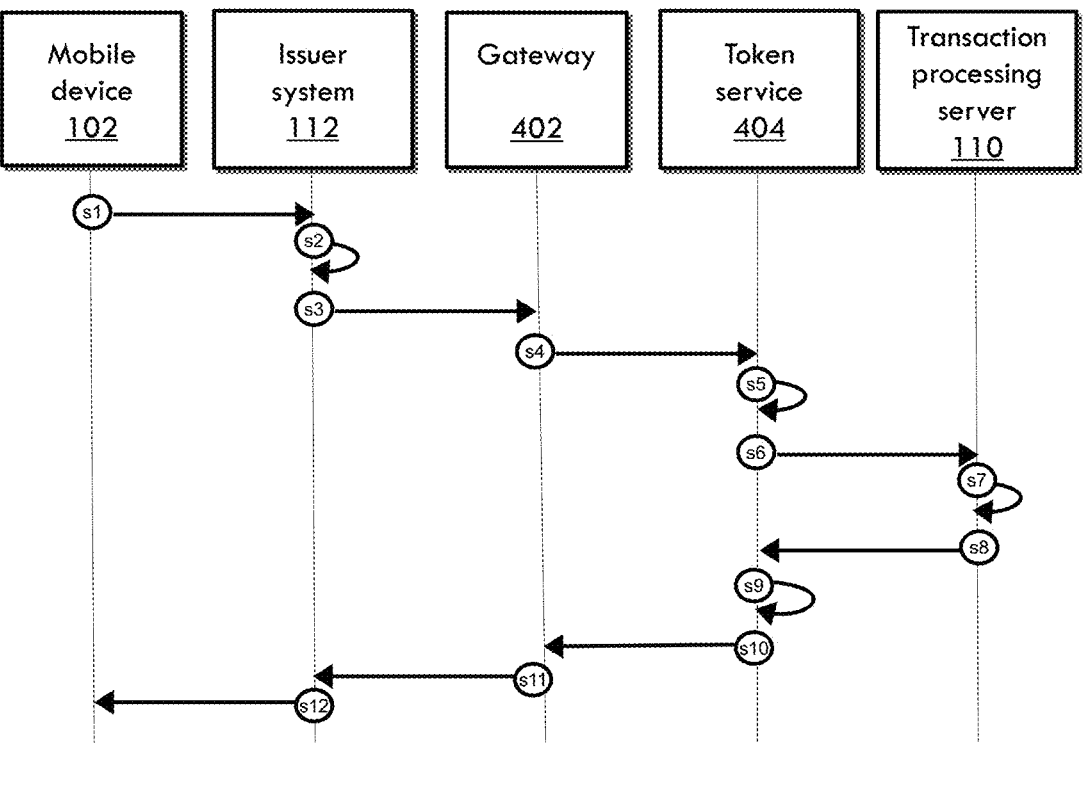
FIG. 4 is a sequence diagram of a method for provisioning a token according to some non-limiting embodiments or aspects.

Referring now to FIG. 4, a sequence diagram is shown for a method of provisioning a token and registering one or more spoken voice or account identifiers according to some non-limiting embodiments or aspects. It will be appreciated that the sequence and steps shown in FIG. 4 are for example only and that various other sequences and steps may be used. At step s1, a mobile device 102 or software application executing on the mobile device 102 or another computing device communicates a provision request to an issuer system 112. At step s2, the issuer system 112 may determine if one or more spoken voice or account identifiers were provided. At steps s3 and s4, the issuer system 112 communicates the provision request to a token service 404 via a gateway 402. The token service 404 may be hosted by a transaction service provider and, in some examples, may be part of the transaction processing server 110. At step s5, the token service 404 validates the provision request and, at step s6, communicates a request to the transaction processing server 110 to create a token and a limited use key (LUK) for making a payment. At step s7, the transaction processing server 110 creates the token and LUK. At step s8, the transaction processing server 110 communicates a notification message to the token service 404 to confirm that the token and LUK were created. The token service 404, at step s9, then stores the token and LUK in a database such that these values correspond to the audio data provided by the user 100. At steps s10, s11, and s12, an encrypted token is communicated to the mobile device 102 to be used for payments. As an example, the encrypted token may be used by an electronic wallet application to initiate transactions with merchants.

Figure 5:
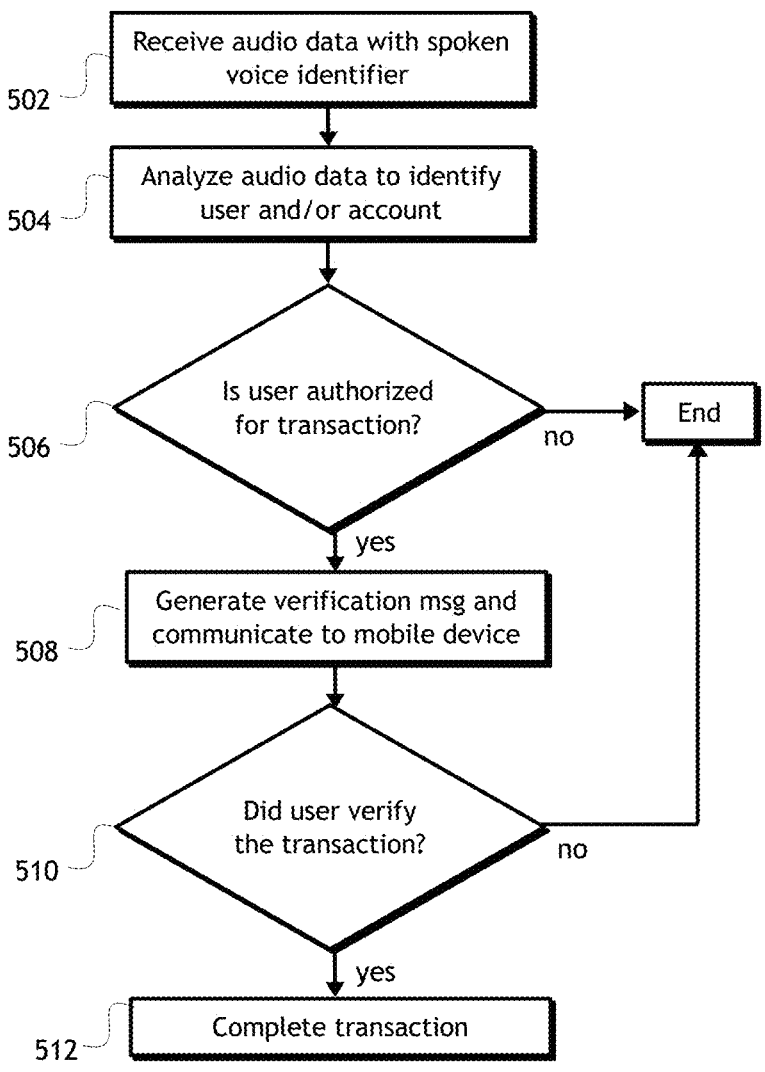
FIG. 5 is a flow diagram of a method for authenticating a transaction according to some non-limiting embodiments or aspects.

Referring now to FIG. 5, a flow diagram is shown for a method of authenticating a transaction based on a voice identifier according to some non-limiting embodiments or aspects. To initiate or as part of a transaction at a merchant, at step 502, audio data representing a spoken voice identifier is received from a user. The spoken voice identifier may be, for example, a name, number, phrase, account identifier, password, and/or the like. At step 504, the audio data is analyzed to identify the user and/or a specific account. For example, audio data representing the spoken voice identifier may be compared to and matched with stored audio data. At step 506, it is determined whether the user is authorized to conduct the transaction. Determining whether the user is authorized may include authenticating the user based on a speech recognition algorithm or receipt of a password. Determining whether the user is authorized may also include determining whether the user has the credit and/or funds to proceed with this transaction, determining whether the user has permission for conducting transactions based on voice identifiers, and/or the like.

With continued reference to FIG. 5, if the user is not authorized for the transaction at step 506, the method may end. If the user is authorized for the transaction at step 506, the method proceeds to step 508 and a verification message is generated and communicated to a mobile device associated with the user. The verification message may cause the mobile device to prompt the user for input, such as a verification of the transaction, a biometric input, a password, a PIN, and/or the like. At step 510, it is determined whether the user verified the transaction. It may also be determined at step 510 if the user is authorized for the transaction based on authenticating the user, in addition or alternative to the authorization in step 506. If it is determined that the user did not verify the transaction at step 510, the method may end after a predetermined time interval elapses. The method may also end at step 510 if the user rejects the transaction or, in some non-limiting embodiments or aspects in which the user is authenticated, the user is determined not to be authentic. If it is determined that the user did verify the transaction at step 510 and/or if the user is authenticated, the method may proceed to step 512 in which the transaction is completed.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method for authenticating a transaction, comprising:

registering, with at least one authentication database, a voice identifier for a user having at least one account identifier, the authentication database comprising a plurality of voice identifiers for a plurality of users;

during a transaction between the user and a merchant, communicating, from a mobile device operated by the user to a merchant point-of-sale system, audio data comprising a spoken voice identifier captured by a microphone of the mobile device;

communicating the audio data from the merchant point of sale system to at least one processor of an authentication system;

matching, with the at least one processor, the spoken voice identifier to a matching voice identifier from the plurality of voice identifiers stored in the at least one authentication database;

identifying, with the at least one processor, the user from the plurality of users based at least partially on the matching voice identifier;

in response to identifying the user of the plurality of users, communicating, with the at least one processor, a verification message to the mobile device operated by the user, the verification message comprising transaction data for the transaction and configured to prompt the user for an input;

receiving, with the at least one processor, an authentication signal generated by the mobile device operated by the user in response to the input; and in response to receiving the authentication signal, conducting or initiating, with the at least one processor, the transaction using the at least one account identifier associated with the user.

2. The computer-implemented method of claim 1, further comprising:

processing the audio data with a natural language processing algorithm to determine words and/or syllables of the spoken voice identifier, wherein each of the plurality of voice identifiers stored in the authentication database comprises one or more words, and wherein matching the spoken voice identifier to the matching voice identifier comprises comparing the words and/or syllables of the spoken voice identifier to the one or more words stored in the authentication database.

3. The computer-implemented method of claim 1, further comprising:

processing the audio data to generate a pattern based on waveforms of the audio data representing the spoken voice identifier, wherein each of the plurality of voice identifiers stored in the authentication database comprises at least one pattern, and wherein matching the spoken voice identifier to the matching voice identifier comprises comparing the pattern of the spoken voice identifier to the at least one pattern stored in the authentication database.

4. The computer-implemented method of claim 1, further comprising:

processing the audio data to generate a unique signature based on hashing the audio data, wherein each of the plurality of voice identifiers stored in the authentication database comprises at least one signature, and wherein matching the spoken voice identifier to the matching voice identifier comprises comparing the unique signature generated from the audio data comprising the spoken voice identifier to the at least one signature stored in the authentication database.

5. The computer-implemented method of claim 1, wherein the voice identifier is associated with a plurality of user account identifiers associated with the user, the method further comprising:

determining, with at least one processor, the account identifier used to conduct the transaction from the plurality of user account identifiers based on selection by the user on the mobile device.

6. The computer-implemented method of claim 1, wherein registering the voice identifier for the user is based on a series of prompts displayed to the user on the mobile device, and wherein the series of prompts comprises a prompt for the user to speak into the microphone.

7. The computer-implemented method of claim 1, wherein the spoken voice identifier comprises at least one of the following: a name, number, phrase, account identifier, password, or any combination thereof.

8. The computer-implemented method of claim 1, wherein the authentication signal is generated by the mobile device in response to authenticating a biometric input of the user.

9. A system for authenticating a transaction comprising at least one processor programmed or configured to:

register, with at least one authentication database, a voice identifier for a user having at least one account identifier, the authentication database comprising a plurality of voice identifiers for a plurality of users;

during a transaction between the user and a merchant, communicate, from a mobile device operated by the user to a merchant point-of-sale system, audio data comprising a spoken voice identifier captured by a microphone of the mobile device;

communicate the audio data from the merchant point of sale system to at least one processor of an authentication system;

match the spoken voice identifier to a matching voice identifier from the plurality of voice identifiers stored in the at least one authentication database;

identify the user from the plurality of users based at least partially on the matching voice identifier;

in response to identifying the user of the plurality of users, communicate a verification message to the mobile device operated by the user, the verification message comprising transaction data for the transaction and configured to prompt the user for an input;

receive an authentication signal generated by the mobile device operated by the user in response to the input; and in response to receiving the authentication signal, conduct or initiate the transaction using the at least one account identifier associated with the user.

10. The system of claim 9, wherein the at least one processor is further programmed or configured to:

process the audio data with a natural language processing algorithm to determine words and/or syllables of the spoken voice identifier, wherein each of the plurality of voice identifiers stored in the authentication database comprises one or more words, and wherein matching the spoken voice identifier to the matching voice identifier comprises comparing the words and/or syllables of the spoken voice identifier to the one or more words stored in the authentication database.

11. The system of claim 9, wherein the at least one processor is further programmed or configured to:

process the audio data to generate a pattern based on waveforms of the audio data representing the spoken voice identifier, wherein each of the plurality of voice identifiers stored in the authentication database comprises at least one pattern, and wherein matching the spoken voice identifier to the matching voice identifier comprises comparing the pattern of the spoken voice identifier to the at least one pattern stored in the authentication database.

12. The system of claim 9, wherein the at least one processor is further programmed or configured to:

process the audio data to generate a unique signature based on hashing the audio data, wherein each of the plurality of voice identifiers stored in the authentication database comprises at least one signature, and wherein matching the spoken voice identifier to the matching voice identifier comprises comparing the unique signature generated from the audio data comprising the spoken voice identifier to the at least one signature stored in the authentication database.

13. The system of claim 9, wherein the voice identifier is associated with a plurality of user account identifiers associated with the user, the at least one processor is further programmed or configured to:

determine the account identifier used to conduct the transaction from the plurality of user account identifiers based on selection by the user on the mobile device.

14. The system of claim 9, wherein registering the voice identifier for the user is based on a series of prompts displayed to the user on the mobile device, and wherein the series of prompts comprises a prompt for the user to speak into the microphone.

15. The system of claim 9, wherein the spoken voice identifier comprises at least one of the following: a name, number, phrase, account identifier, password, or any combination thereof.

16. The system of claim 9, wherein the authentication signal is generated by the mobile device in response to authenticating a biometric input of the user.

17. A computer program product for authenticating a transaction, comprising at least one non-transitory computer readable medium including program instructions that, when executed by at least one processor of at least one computer, cause the at least one computer to:

register, with at least one authentication database, a voice identifier for a user having at least one account identifier, the authentication database comprising a plurality of voice identifiers for a plurality of users;

during a transaction between the user and a merchant, communicate, from a mobile device operated by the user to a merchant point-of-sale system, audio data comprising a spoken voice identifier captured by a microphone of the mobile device;

communicate the audio data from the merchant point of sale system to at least one processor of an authentication system;

match the spoken voice identifier to a matching voice identifier from the plurality of voice identifiers stored in the at least one authentication database;

identify the user from the plurality of users based at least partially on the matching voice identifier;

in response to identifying the user of the plurality of users, communicate a verification message to the mobile device operated by the user, the verification message comprising transaction data for the transaction and configured to prompt the user for an input;

receive an authentication signal generated by the mobile device operated by the user in response to the input; and in response to receiving the authentication signal, conduct or initiate the transaction using the at least one account identifier associated with the user.

18. The computer program product of claim 17, wherein the at least one processor is further programmed or configured to:

process the audio data with a natural language processing algorithm to determine words and/or syllables of the spoken voice identifier, wherein each of the plurality of voice identifiers stored in the authentication database comprises one or more words, and wherein matching the spoken voice identifier to the matching voice identifier comprises comparing the words and/or syllables of the spoken voice identifier to the one or more words stored in the authentication database.

\* \* \* \* \*